(No Model.) 2 Sheets—Sheet 2.
H. SEE & G. L. CARDEN.
WAVE QUIETING DEVICE.
No. 527,513. Patented Oct. 16, 1894.
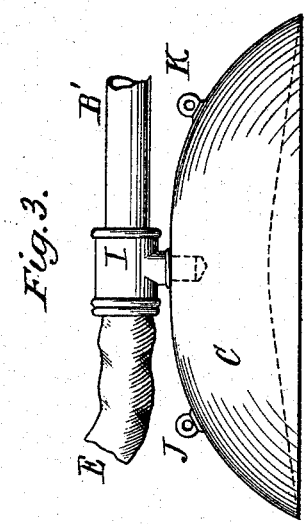
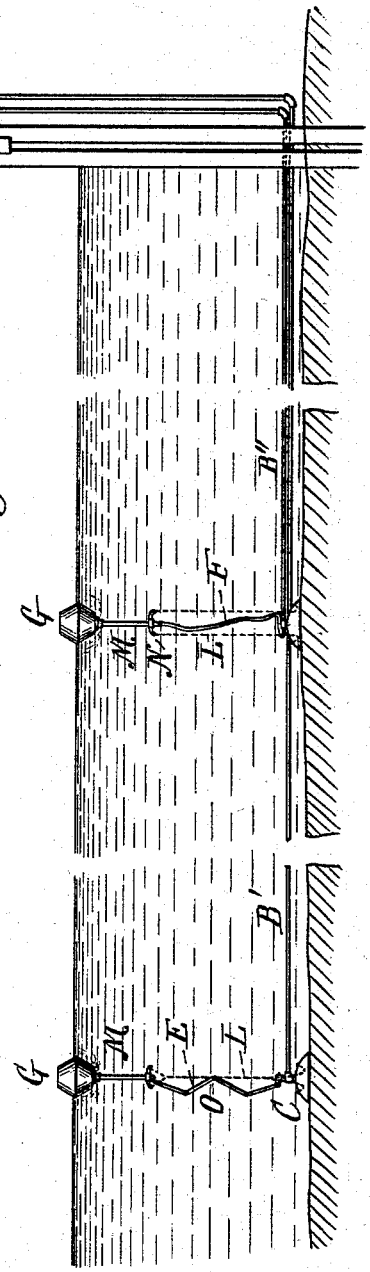
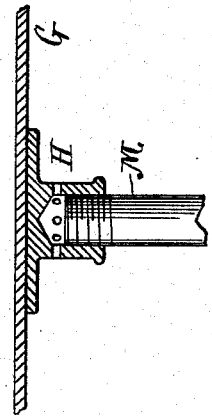

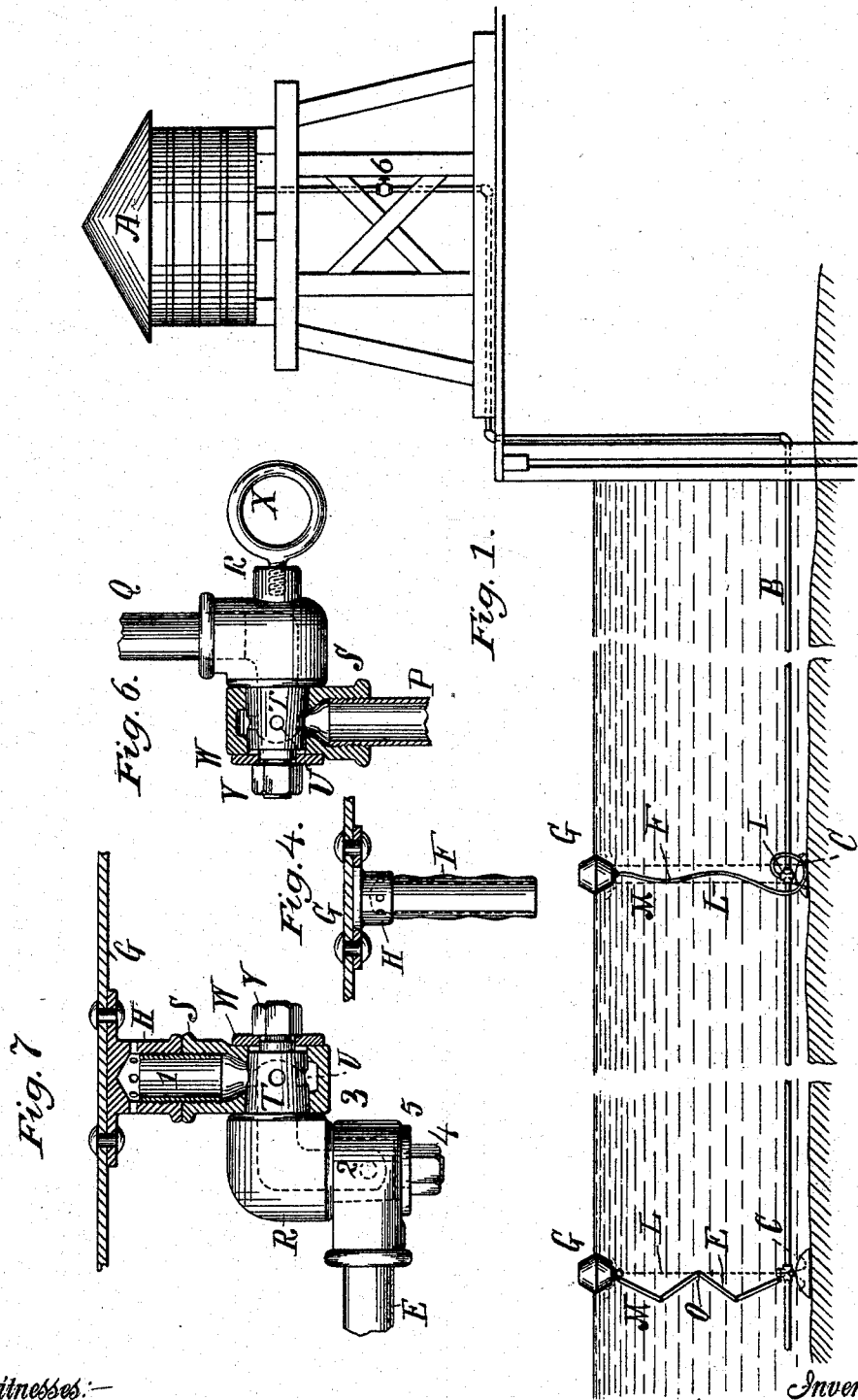

UNITED STATES PATENT OFFICE.

HORACE SEE AND GODFREY L. CARDEN, OF NEW YORK, N. Y.

WAVE-QUIETING DEVICE.

SPECIFICATION forming part of Letters Patent No. 527,513, dated October 16, 1894.

Application filed March 8, 1893. Serial No. 465,104. (No model.)

*To all whom it may concern:*

Be it known that we, HORACE SEE and GODFREY L. CARDEN, of the city, county, and State of New York, have invented a new and useful Improvement in Wave-Quieting Devices, of which the following is a specification.

In another application for Letters Patent, filed simultaneously herewith by us, we have fully described and claimed broadly our device for protecting vessels or other structures in harbors, roadways, or other bodies of water adjacent to land from the effects of waves; the said device consisting substantially of a source of oil-supply located on land, and communicating therewith and conducting the oil therefrom to a distant point, a submarine pipe having its outlet disposed below the surface of the water.

Our present invention consists in a construction of this device, whereby the oil is delivered, not below, but about at, the surface of the water. In order to accomplish this, we combine with the main pipe or pipes which conduct the oil from the source of supply one or more branch pipes leading to the surface of the water. These branch pipes we make either of rigid material connected by joints, or of flexible material, such as rubber or leather, and we support them by means of floating buoys, to which each pipe is connected. By this means we do away with rigid vertical branch pipes, which, if leading to the surface of the water, would necessarily be in the way of vessels, and which would, of course, not change the position of their outlets with the rise and fall of the tide. Our invention further consists in certain details of construction whereby the joints of said pipes are made and the parts connected, all as hereinafter more particularly set forth.

In the accompanying drawings, Figure 1 is a side elevation and section showing the arrangement of oil-tank on shore and a pipe leading therefrom under water, and provided with means for allowing of the escape of oil at or very near to the surface of the water at various points along the length of said pipe. Fig. 2 is a similar view in which the oil-pipe from the reservoir is shown connected to a number of branch pipes, each supported by a buoy so as to deliver its oil at or very near to the surface of the water. Fig. 3 is a side elevation of a mushroom anchor and the union for connecting the main distributing pipe and the flexible branch pipe thereto. Fig. 4 is an outside view and Fig. 5 is a section illustrating the method of fastening the branch pipes to the under side of the buoys, and also showing the points of escape of the oil. Fig. 6 shows the construction of one of the joints of a jointed branch pipe in partial section, and Fig. 7 shows a preferable form of universal joint by which a branch pipe may be connected to its buoy.

Similar letters and figures of reference indicate like parts.

A is the oil-tank placed on an elevated point on shore and sufficiently high above the water to allow of sufficient head to force the oil by gravity through the system of distributing pipes. This is only a preferable arrangement, because, as is obvious, the tank may be disposed in any way and the oil forced therefrom into the distributing pipes by means of a pump.

B, Fig. 1, is a pipe extending from the tank A and along the bottom of the water-way to the extreme point at which it is desired to quiet the waves. In said pipe B is arranged a regulating valve, 6, for controlling the amount of oil delivered by said pipe. At about the end and at various points along the length of the pipe B are anchors, C, preferably of the mushroom or bowl form, represented in Fig. 3. Communicating with the main pipe B at intervals along its length are flexible branch pipes, as E and F, the upper extremities of which pipes are fastened to floating buoys, G.

In the construction shown in Fig. 2, the pipe 7 from the tank A connects with a series of branch pipes, B', B'', &c., each of which pipes terminates in a vertical flexible pipe, E or F, which is connected with a buoy, G. In each pipe, B' or B'', is arranged a regulating valve similar to valve 6 for controlling the amount of oil delivered from each pipe. There may be several branch pipes, as E or F, along the length of each pipe B or B'. The construction of the branch pipes, E or F, we may vary. Thus, we may employ simply a flexible pipe, as shown at F, connected to the main pipe B', which may be of rubber or leather and be received in a perforated flanged collar, H, Fig. 4, which is bolted to the under side of the buoy G. The union, I, by which the main pipe is connected to the flexible pipe F, also serves to connect the main pipe to the anchor C.

The anchor C is provided with two eye-bolts, J and K, to which are attached chains, L, dotted lines, Fig. 1, extending down from the lower side of the buoy G. These chains serve as additional moorings for the buoy. The length of the chains is such as to prevent any direct strain from the buoy coming upon the flexible pipes; or, in other words, the chains are made shorter than the pipes.

Instead of fastening the flexible pipe F directly to the bottom of the buoy, as shown in Fig. 4, we may secure it in any suitable way to a short rigid pipe, M, extending downward from the buoy, as indicated in Fig. 2.

Extending from the lower portion of the pipe M are arms, N, to which the chains L are attached. The object of the short pipe N is to carry the place of connection of the flexible pipe to the buoy to a point sufficiently below the surface of the water to prevent any injury to the flexible pipe by floating ice. The length of the pipe M may therefore be regulated in proportion to the ordinary thickness of floating or pack ice in the vicinity. Instead of using a flexible pipe, F, we may use a jointed pipe, E; the lower end of said jointed pipe E being connected to the union, which unites the main pipe to the mushroom anchor C, and the upper end being connected either directly with the buoy G, as shown in Fig. 1, or with a depending pipe, M, from said buoy G, as shown in Fig. 2. With this construction, instead of there being two chains, as L, there is only one chain, L, which is either fastened directly to the lower portion of the buoy, as shown in Fig. 1, or to arms on the depending pipe M, as shown in Fig. 2. In either case, the chain L passes through an eye arranged at the middle joint, O, of the jointed pipe E. When the depending pipe M is used in connection with the buoy G, it is attached to the lower side of the buoy G, as shown in Fig. 5, and as already described in connection with Fig. 4; pipe M here being threaded, and thus held in the perforated collar H.

Fig. 6 represents a simple form of joint for uniting together the parts of the jointed pipe E. In this figure, P and Q are two lengths of pipe to be jointed together. The pipe Q is received in the elbow R and the pipe P in the box S. Extending from the elbow R is a tubular projection, T, which is received in an opening in the box S so that the box S turns thereon. In the projection T are numerous openings, as U. The projection T is held in the box S by means of the nut V and washer W. It will be apparent that by reason of the openings U there will always be free passage for liquid between the pipes P and Q, no matter at what angle they may stand to one another. Also carried by the elbow R is the ring X, through which passes the chain L.

In Fig. 7 is shown the universal joint by means of which the upper section of the jointed pipe E is secured to the buoy. In this device, R is an elbow, as before, having a perforated projection, T, which is received in the box S, and is secured therein by means of the nut V and washer W so that the box S is free to turn on the projection T, as already described in connection with Fig. 6. The lower side of the buoy is represented at G, and thereto is bolted a collar, H, perforated as already described. The collar H and the box S are here internally threaded and are connected together by a short section of pipe, 1, which is externally threaded. Also on the elbow R and on the opposite side thereof is another perforated projection, 2, similar to projection T, which is received in a box, 3, and therein secured by a nut, 4, and washer, 5. The box 3 receives the first joint of the pipe E, which may be curved or laid therefrom in any desired direction.

Instead of making the pipes B and B' of rigid material, as is here shown, we may make them of flexible material, or we may joint them in any desired way so that they can be laid in curves or conveniently laid from a boat or ship in any desired direction, as circumstances may require.

The possible applications of this invention are very numerous. Thus, the distributing pipe or pipes may be carried along the edge of a bar or reef to prevent the formation of breakers or dangerous surf. They may be arranged beside a bar, breakwater, or seawall, in order to quiet the waves which might imperil the structure or render the landing of boats thereat or mooring of vessels thereto dangerous. They may be led along the bottom of straits or passages, or across the mouths of bays, and thus prevent the formation of high seas therein. As the invention can be applied almost anywhere and at very small expense, it will be found of great utility in localities where there is insufficient protection for small boats against the sea when the wind is in certain directions. Instances of such *quasi* harbors abound, for example, along the southern shore of Connecticut, in which a small boat might ride in safety under all conditions except that of a southwest gale. In such case, an oil-pipe run out from the westerly side of the harbor and in a southeasterly direction, would effectually prevent a rough sea between it and the land, and thus serve practically the purposes of a breakwater at a very greatly reduced expense.

Our invention is also of especial utility for the protection of coffer dams and of marine structures generally while in process of building. To this end we may arrange a source of oil-supply either on the structure itself or upon any suitable float, raft, or other support, and carry the distributing pipes entirely around the structure to be protected. For such uses, it may be desirable to make the main distributing pipes flexible or jointed, so that they can be conveniently transported and laid.

While we primarily intend our invention for the use described, it is of course susceptible to other and cognate employments; such, for example, as for purposes of defense of harbors. In such case, any volatile oil or other material of high inflammability may be forced through the system and ignited on the surface of the water by any suitable means, thus preventing passage of the enemy's vessel through it; or, instead of forcing such inflammable material through the system, we may force any deadly substance which will destroy or injure the crews of attacking vessels; such for example as amyl nitrite, which will float upon water and give off gases extremely deleterious to the human life.

We claim—

1. A stationary source of oil supply, and communicating therewith and conducting the oil to a distant point, a submarine pipe, a flexible branch conduit having an oil outlet, and a buoy connected to said conduit, substantially as described.

2. A stationary source of oil supply, a submarine pipe leading therefrom, a flexible conduit extending from said submarine pipe and having an oil outlet, a buoy connected to said conduit near its end and means for mooring said buoy in place independently of said flexible conduit, substantially as described.

3. A stationary source of oil supply, a submarine pipe leading therefrom, a flexible conduit extending from said submarine pipe and having an oil outlet, a buoy connected to said conduit near its end, and an anchor to which both said submarine pipe and said buoy are connected, substantially as described.

4. A stationary source of oil supply, a submarine pipe leading therefrom, a flexible conduit extending from said submarine pipe and having an oil outlet, an anchor to which said submarine pipe is connected, a buoy connected to said flexible conduit near its end, and a mooring cable or chain between said buoy and said anchor; the said cable being shorter in length than said flexible conduit, substantially as described.

5. In combination with a source of oil supply on land, the submarine pipe B, anchor C attached thereto, a flexible conduit, having an oil outlet, buoy G connected to said conduit and chain L extending from said buoy to said anchor, substantially as described.

6. In combination with a submarine oil supply pipe having a flexible extension, a buoy, G, supporting said extension, and a perforated, flanged collar, H, uniting said extension to said buoy, substantially as described.

7. In combination with a submarine oil supply pipe, a pipe section, as M, connected at one end to said pipe, and a buoy, G, to which the other end of said section M is secured; the said section M having an oil outlet near its junction to said buoy, substantially as described.

HORACE SEE.
GODFREY L. CARDEN.

Witnesses as to Horace See:
  JAMES T. LAW,
  H. R. MOLLER.

Witnesses as to Godfrey L. Carden:
  EDWIN H. LOW,
  H. R. MOLLER.